Figure 1:
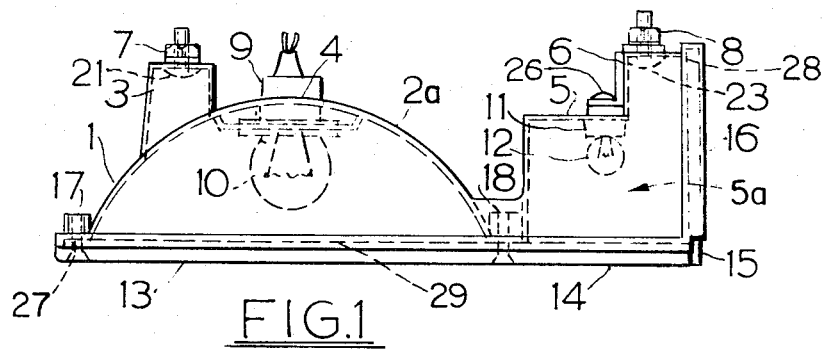

United States Patent [19]
Hedgewick

[11] 3,766,373
[45] Oct. 16, 1973

[54] WRAP-AROUND TAIL LIGHT

[75] Inventor: Peter Hedgewick, Windsor, Ontario, Canada

[73] Assignee: Reflex Corporation of Canada Limited, Windsor, Ontario, Canada

[22] Filed: May 5, 1972

[21] Appl. No.: 250,551

[52] U.S. Cl. ............... 240/8.3, 240/8.2, 240/8.24, 240/41.3
[51] Int. Cl. ............................................. B60q 1/24
[58] Field of Search ................. 240/8.24, 8.3, 8.1, 240/8.2, 7.1, 8.22, 8.26, 41.2, 41.3, 41.55; 340/93, 94, 95, 100, 112

[56] References Cited
UNITED STATES PATENTS

| | | | |
|---|---|---|---|
| 1,535,282 | 4/1925 | Zschunke | 240/41.2 |
| 1,547,307 | 7/1925 | Earnshaw | 240/8.3 |
| 1,553,923 | 9/1925 | Baker | 240/41.2 |
| 1,578,772 | 3/1926 | Sims | 240/41.2 X |
| 2,023,393 | 12/1935 | Albred | 240/8.3 |
| 3,093,320 | 6/1963 | Knapp | 240/8.2 |
| 3,275,816 | 9/1966 | Brunger | 240/41.3 X |

*Primary Examiner*—Samuel S. Matthews
*Assistant Examiner*—E. M. Bero
*Attorney*—Gerald E. McGlynn et al.

[57] ABSTRACT

A vehicle lamp assembly having a curved reflector chamber and an adjacent indented chamber, each chamber having its own respective light source. A lens covers the front openings of both the reflector and indented chambers. A second lens covers the side opening of the indented chamber. At least one of the lenses can be slidably mounted over its respective opening. The vehicle lamp can also be a combination tail light, stop light, side marker light, turn signal, and rear and side reflectors for use on a trailer.

10 Claims, 4 Drawing Figures

PATENTED OCT 16 1973  3,766,373

WRAP-AROUND TAIL LIGHT

This invention relates generally to electrically illuminated tail lights of motorized vehicles, and particularly to such lights used on trailers, the bottom framework of which are made of channel iron.

When trailers are used on the highways it is required by traffic safety ordinance that they should be equipped with illuminated tail lights, stop lights, turn signals, and side markers, which can be clearly seen at night, and a number of reflecting units which will reflect daylight and the light from the head lights of cars approaching from the rear. These various car accessories are at the present time usually installed as separate units, thus increasing the cost of such installations and requiring a great deal of maintenance.

It is therefore the object of this invention to provide a tail light for trailers which will combine the above mentioned accessories into a single unit requiring a single simplified low cost installation and requiring an insignificant amount of maintenance.

This is accomplished in the invention by providing a tail light having a general construction somewhat in the shape of an "L" so that when it is installed on the rear lower corner of a trailer, one part thereof acts as an illuminated tail light while the other part acts as an illuminated side marker. Furthermore, the transparent front and side panels or windows, are of a outer shiny surface which is embossed with patterns in the inner surface to make them into efficient light reflectors.

Figure 2:
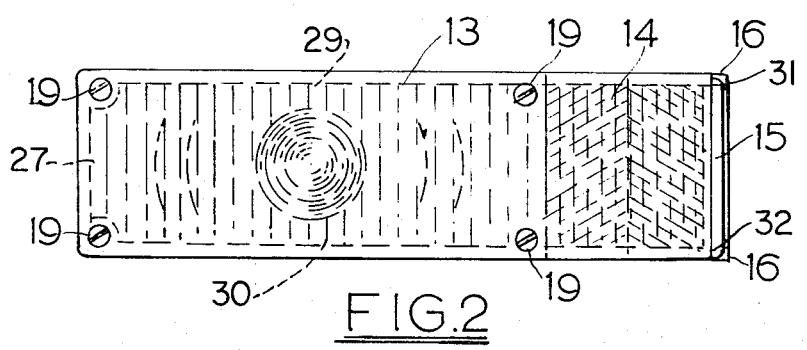
Figure 3:
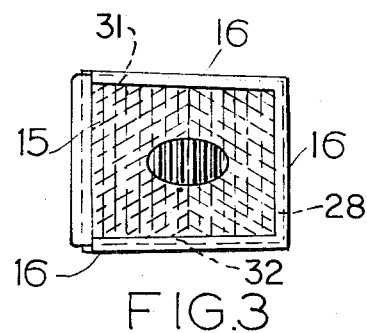
Figure 4:
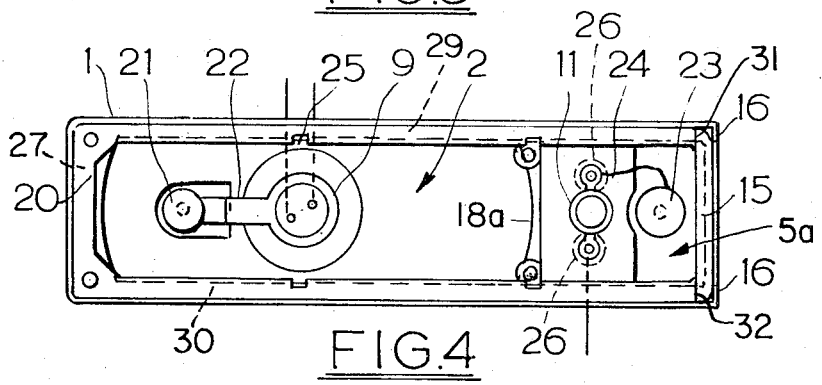

In describing the invention reference will be made to the attached drawings in which, FIG. 1 is a top view of the invention,
FIG. 2 is a front view of the invention,
FIG. 3 is a side view of the invention, and
FIG. 4 is a front view of the invention with the front window removed to show the interior.

In the drawings is shown a combined tail light and side marker consisting of a lamp housing or container 1, preferably made of a white colored opaque plastic material capable of withstanding a moderate amount of heat. The front face of container 1 is in the form of an L-shaped rectangle, the long side of which serves as the tail light, while the short side acts as the side marker, when the unit is installed in the framework of a trailer.

The rear of the container 1 is formed into a tail light chamber 2 having a curved reflector chamber wall 2a on one side of which is a tubular hollow extension 3, and in the center of which is a circular opening 4. On one side of the said reflector chamber is a side marker chamber 5a in the form of a rectangularly indented box shaped chamber, one side of said indentation being referred to as chamber portion 5, the other indentation being referred to as chamber portion 6. The open faces of the chamber portions 5 and 6 abut the L-shaped front of the container 1.

A bolt and nut terminal 7 is attached to the extension 3, while a similar terminal 8 is attached to the chamber 6. The terminals 7 and 8 are the means by which the unit is attached to the trailer frameworks, and also serve as the ground for the electrical circuit. A socket 9 is installed in the tail light chamber 2, and an electric globe 10 is inserted into said socket. The globe 10 provides the illumination for the tail light. The illumination for the side marker is provided by the electric globe 12 which is located in the socket 11 which is in turn located in the side marker chamber portion 5.

The front panel or window or tail light lens 13 of the tail light is preferably made of a red colored transparent plastic material capable of withstanding the action of a moderate heat. The front or exposed side of the window or tail light lens 13 consists of a smooth, shiny mirror finish, while the inner face of the tail light lens 13 is embossed with a central circular pattern and a plurality of equally spaced vertical ribs surrounding the circular pattern. This embossing runs from one side of the tail light lens 13 to its border line with the chamber 5. Thereafter the tail light lens 13 is embossed with a denser pattern area 14 consisting of a series of interconnected hexagons or the like. The purpose of this pattern arrangement is to reduce the light emission at the side marker to provide separation between the two lights.

The shorter side of the "L" consists of the chamber portions 5 and 6 which are enclosed with a side marker lens or window 15 of the same material as the tail light lens 13. This window is embossed with a centrally located ellipse which is surrounded by a dense embossing of interconnected hexagons on the inner face, and has a mirror finish on its outer face.

The tail light lens 13 is attached to the container 1 by means of a plurality of screws 19 which screw into bosses 17 and 18 provided in the container 1 bosses 17 and 18 are located at the ends of a partition 18a extending between the tail light chamber 2 and the side marker chamber 5a. The side marker lens or window 15 slides in tracks 16. The window 13 is shortened by the thickness of the window 15 so that after the window 13 is attached as described, the window 15, which is made long enough to cover the area left uncovered by 13, is inserted into and held by the tracks 16. A rubber gasket 20 is inserted between the window 13 and the container 1.

Electrical connections of the invention are provided so that it can function as a tail light, stop light, turn signal, and side marker. In FIG. 4, the interior of the container 1 is shown in order to expose some of these electrical connections. The head 21 of the bolt in terminal 7 is connected to the socket 9 in the reflecting chamber by a copper strip 22. The head 23 of the bolt in the terminal 8 is connected by means of a wire 24 to one of the terminals of the socket 11, the heads 26 of which are on the outside of the chamber 5.

To simplify and reduce the cost of production, the gasket 20 is located and held by projections 25 in the rim of the face of the container 1. Thus, as illustrated in the drawings, a vehicle lamp assembly according to the present invention includes an elongate, opaque, plastic lamp housing or container 1 formed with a tail light chamber 2 and a side marker chamber 5a. A tail light opening is defined at the open front of the housing 1 and communicates with the tail light chamber 2. Light is emitted from the tail light chamber 2 through the tail light opening. The side marker opening is defined at the open end of the housing through which light is emitted from the side marker chamber 5a. The housing is formed with a front end edge 27, a front upper edge 29 joined at one end of the front end edge and front lower edge 30 joined at one end to the front end edge 27 and extending from the front end edge in spaced parallel relationship with the front upper edge 29. The front end edge 27, front upper edge 29 and front lower edge 30 extend around the periphery of the tail light opening. The housing 2 is also formed with a side end edge 28 which is spaced from the front end edge 27 and lies in a plane that intersects the plane of the front end edge as well as the plane of the front upper and lower edges 29 and 30. A side upper edge 31 lies in the plane of the side end edge 28 and extends between the front upper edge 29 and the side end edge 28. Similarly, a side lower edge 32 lies in the plane of the side end edge 28 in parallel relationship with the side upper edge 31 and extends between the front lower edge 32 and the side end edge 28. The side end edge 28 and side upper and lower edges 31 and 32 extend around the periphery of the side marker opening.

A partition 18a is formed in the housing and extends between the tail light chamber 2 and the side marker chamber 5a. As shown in the drawing, partition 18a defines one wall of the side marker chamber 5a.

The rectangular, translucent tail light lens 13 is attached to the housing 1 and closes the tail light opening with one end overlying the end of the tail light opening adjacent the front end edge 27 and its other end extending between the front upper edge 29 and the front lower edge 30 adjacent to the intersection of the plane of the front end edge with the plane of the side end edge 28. The rectangular, translucent side marker lens 15 closes the side marker opening with one end overlying the end of the side marker opening adjacent the side end edge 28 and its other end extending between the side upper edge 31 and the side lower edge 32 adjacent to the intersection of the plane of the front end edge 27 with the plane of the side end edge 28. The end of the lens 13 remote from the front end edge 27 abuts the end of the lens 15 remote from the side end edge 28.

I claim:

1. A single unit, electrically illuminated tail light, stop light, side marker light, turn signal, and rear and side reflectors for installation on trailers having a lower framework of channel section steel, comprising in combination:
   a. a container having an open front, an open side, an enclosed back, and an L-shaped rectangular opening formed by said open front and said open side; said enclosed back of said container being formed part way into a curved reflector chamber, and an idented chamber having a long part along said open side and a rectangular indentaion forming a short part next to said reflector chamber,
   b. a red transparent front window covering the front opening of said container,
   c. a red transparent side window covering the side opening of said container,
   d. an electric lamp centrally located in said reflector chamber and behind said front window,
   e. an electric lamp located within said indented chamber, at the corner of the indentation, and behind said front window,
   f. a hollow extension from one side of said reflector chamber corresponding to said long part of said indented chamber,
   g. a bolt and nut terminal attached to the said hollow extension of the reflector chamber, and a similar terminal attached to said long part of said indented chamber, both said terminals being the means of attaching the tail light to the trailer, and also serving as ground connections for the circuit supplying electricity to said lamps.
   h. electrical connections leading from each of said electric light lamps to the outside of said container,
   i. metallic connections on the inside of said container connecting each of the said lamps to its corresponding nut and bolt terminal.

2. A tail light such as described in claim 1 in which the front and side windows have a mirror finish on their outer surfaces and an embossed geometric pattern on their inner surfaces for the purpose of reflecting light.

3. A tail light such as described in claim 1 in which the windows are removably attached to said container.

4. A tail light such as described in claim 1 in which a gasket of resilient material is provided between the windows and the container at the rim of said container where the window contacts the container, and small locating and retaining projections are provided on the rim of said container for locating and retaining said gasket.

5. A vehicle lamp assembly comprising: an elongate, opaque, plastic lamp housing formed with a tail light chamber having a wall with a light bulb socket mounted thereon and a side marker chamber having a wall with a light bulb socket mounted thereon; said housing having an open front at least a portion of which defines a tail light opening communicating with said tail light chamber through which light is emitted from said tail light chamber; said housing having an open end defining a side marker opening communicating with said side marker chamber through which light is emitted from said side marker chamber; said housing having a front end edge at the end of said open front remote from said open end, a side end edge at the end of said open end remote from said open front, said side end edge being spaced from said front end edge and lying in a plane that intersects the plane of said front end edge, a front upper edge lying in the plane of said front end edge and joined at one end to said front end edge and extending from said front end edge to the plane of said side end edge, a front lower edge lying in the plane of said front end edge in spaced parallel relationship with said front upper edge and joined at one end to said front end edge and extending from said front end edge to the plane of said side end edge, a side upper edge lying in the plane of said side end edge and extending between said front upper edge and said side end edge, and a side lower edge lying in the plane of said side end edge in parallel relationship with said side upper edge and extending between said front lower edge and said side end edge; said front end edge, front upper edge and front lower edge extending around at least a portion of the periphery of said tail light opening; said side end edge, side upper edge and side lower edge extending around at least a portion of the periphery of said side marker opening; a rectangular, translucent tail light lens attached to said housing and closing said tail light opening with one end overlying the end of said tail light opening adjacent said front end edge and its other end extending between said front upper edge and said front lower edge adjacent to the intersection of the plane of said front end edge with the plane of said side end edge; a rectangular, translucent side marker lens attached to said housing and closing said side marker opening with one end overlying the end of said side marker opening adjacent said side end edge and its other end extending between said side upper edge and side lower edge adjacent to the intersection of the plane of said front end edge with the plane of said side end edge; at least one of said lens being slidably mounted on said housing.

6. A vehicle lamp assembly as claimed in claim 5 wherein said side marker lens is slidably mounted on said housing.

7. A vehicle lamp assembly as claimed in claim 6 further including means defining tracks on said housing, said tracks being in substantially parallel relationship with the plane of said side end edge, said side marker lens being received in said tracks.

8. A vehicle lamp assembly as claimed in claim 7 further including a partition in said housing between said tail light chamber and side marker chamber.

9. A vehicle lamp assembly as claimed in claim 8 wherein said partition is located between the ends of said tail light lens and defines a wall of said side marker chamber.

10. A vehicle lamp assembly as claimed in claim 9 wherein said tail light lens extending between said front end edge and said partition is constructed to serve as a lens for permitting the passage of light from said tail light chamber, and the portion of said tail light lens extending between said partition and said side marker lens constitutes a reflective portion of said tail light lens constructed to reflect light and to reduce the passage of light through said tail light lens from said side marker chamber.

* * * * *